United States Patent [19]

Olney

[11] Patent Number: 4,946,584
[45] Date of Patent: Aug. 7, 1990

[54] HYDRAULIC PRODUCT SEPARATOR
[75] Inventor: George J. Olney, Westernville, N.Y.
[73] Assignee: George J. Olney, Inc., Westernville, N.Y.
[21] Appl. No.: 266,322
[22] Filed: Oct. 31, 1988

Related U.S. Application Data

[63] Continuation of Ser. No. 105,317, Oct. 5, 1987, abandoned.

[51] Int. Cl.⁵ .................... B03D 5/62; B03D 5/68
[52] U.S. Cl. ........................... 209/18; 209/156; 209/157; 209/158; 209/460; 209/498; 209/499
[58] Field of Search ................... 209/13, 17, 18, 44, 209/156, 157, 158, 159, 458, 460, 497, 498, 499, 189

[56] References Cited

U.S. PATENT DOCUMENTS

| | | | |
|---|---|---|---|
| 477,111 | 6/1892 | Gates | 209/498 |
| 776,184 | 11/1904 | Le Strange | 209/498 |
| 777,176 | 12/1904 | Bennett | 209/44 |
| 1,198,404 | 9/1916 | Ballantine | 209/156 |
| 1,696,767 | 12/1928 | Hoyois | 209/158 |
| 1,845,602 | 2/1932 | Hoyois | 209/158 |
| 1,912,077 | 5/1933 | Hoyois | 209/158 |
| 1,973,439 | 9/1934 | Mason | 209/498 |
| 2,074,977 | 3/1937 | Bird | 209/495 |
| 2,139,047 | 12/1938 | Tromp | 209/156 |
| 2,246,532 | 6/1941 | Prins | 209/18 |
| 2,362,130 | 11/1944 | Glenn | 209/156 |
| 2,365,734 | 12/1944 | Tromp | 209/156 |
| 2,383,045 | 3/1944 | Breejen | 209/17 |
| 2,453,293 | 11/1948 | Aurilio | 209/156 |
| 2,548,142 | 4/1951 | Carter | 209/44 |
| 2,590,756 | 3/1952 | Colin | 209/156 |
| 4,259,179 | 3/1981 | Marvin | 209/18 |

FOREIGN PATENT DOCUMENTS

| | | | |
|---|---|---|---|
| 22655 | 10/1912 | United Kingdom | 209/158 |
| 153790 | 11/1920 | United Kingdom | 209/158 |
| 218353 | 7/1924 | United Kingdom | 209/156 |
| 254693 | 7/1925 | United Kingdom | 209/158 |
| 371174 | 4/1932 | United Kingdom | 209/18 |
| 505906 | 5/1939 | United Kingdom | 209/458 |
| 699132 | 10/1953 | United Kingdom | 209/13 |

Primary Examiner—David L. Lacey
Assistant Examiner—Thomas M. Lithgow
Attorney, Agent, or Firm—Wall and Roehrig

[57] ABSTRACT

A product separator having a flotation tank through which a quantity of product is passed in a flow of water. A shaped duct having a horizontal capture leg and an upwardly inclined discharge leg is connected into the floor of the tank so that the entrance of the capture leg communicates with the flow and an upper exit in the discharge leg empties into a vibratory hopper. A raised gate passes upwardly into the flow and directs less buoyant product into the capture leg. An ejector is positioned in the bottom of the capture leg and is arranged to direct a continuous high velocity stream of water across the transition region between the two legs into the discharge chute into a segregation hopper.

4 Claims, 2 Drawing Sheets

HYDRAULIC PRODUCT SEPARATOR

This is a continuation of application Ser. No. 105,317, filed Oct. 5, 1987, now abandoned.

BACKGROUND OF THE INVENTION

This invention relates to a product separator and, in particular, to apparatus for separating peanuts affected by aflatoxin from healthy peanuts.

Research has shown that certain table agricultural commodities are susceptible to mycotoxin producing fungi. Among the toxin producing fungi that attack agricultural products is aflatoxin which is found in peanuts. The fungi attacks both the pod and the kernel of the peanut while it is growing in the soil before the nut is harvested. After the nut has been harvested, the contaminated nuts are typically segregated manually from the unaffected nuts using only visual inspection techniques. This manual procedure has proven to be less than satisfactory in that many contaminated nuts fail to be visually detected particularly if they are in the early stages of contamination. Accordingly, some peanuts affected with aflatoxin can find their way into food products.

SUMMARY OF THE INVENTION

It is therefore an object of the present invention to provide apparatus that can quickly and accurately separate contaminated products from uncontaminated products.

Another object of the present invention is to prevent contaminated products from being consumed by humans.

Yet another object of the present invention is to eliminate the need to manually separate contaminated peanuts from uncontaminated peanuts.

Still another object of the present invention is to automatically separate peanuts affected by aflatoxin from peanuts that are not affected.

These and other objects of the present invention are attained by a product separator that includes a flotation tank through which a product such as peanut kernels are transported by a flow of water moving between the tank inlet and outlet. A V-shaped duct having a capture leg and a discharge leg is mounted beneath the tank. The capture leg is connected into the floor of the tank and a raised gate is mounted at the entrance to the leg for directing less buoyant products in the flow into the duct. The height to which the gate is raised can be adjusted to accurately control which product will be directed into the duct and which will be carried out of the tank in the flow. An ejector is located in the bottom of the duct which is arranged to direct a stream of high velocity water up the discharge leg of the duct to propel product from the bottom of the duct through the raised exit of the leg. The ejector nozzle is a narrow uninterrupted slit that extends across the entire width of the duct to produce a solid wall of water moving up the discharge leg and thus prevent any product from stagnating in the duct. As a result, all product delivered into the tank moves rapidly through the system.

BRIEF DESCRIPTION OF THE DRAWINGS

For a better understanding of these and other objects of the present invention, reference is made to the following detailed description of the invention which is to be read in association with the accompanying drawing, wherein.

DESCRIPTION OF THE INVENTION

It has been discovered that the buoyancy in water of peanuts that are infected with aflatoxin producing fungi is increased when compared to healthy peanuts. The sound kernels, which tend to sink in water, can therefore be separated from fungi bearing undesirable kernels using flotation techniques. However, most flotation processes utilize brine or other undesirable liquids as a flotation medium which cannot be tolerated by peanuts. Exposure to these solutions leads to rapid deterioration of the nut. Similarly, immersion of the peanut in untreated water for even short periods of time can have a harmful effect on the kernel. Peanuts can only tolerate very short exposure to water before they must be quickly removed from the bath and dried. As will become evident from the disclosure below, the apparatus of the present invention is capable of carrying out a flotation separation process, under controlled conditions wherein the produce remains in the bath for a minimum amount of time. The flow of water through the system is closely controlled whereby the product is prevented from stagnating even for short periods of time as it moves through processing equipment.

Figure 1:
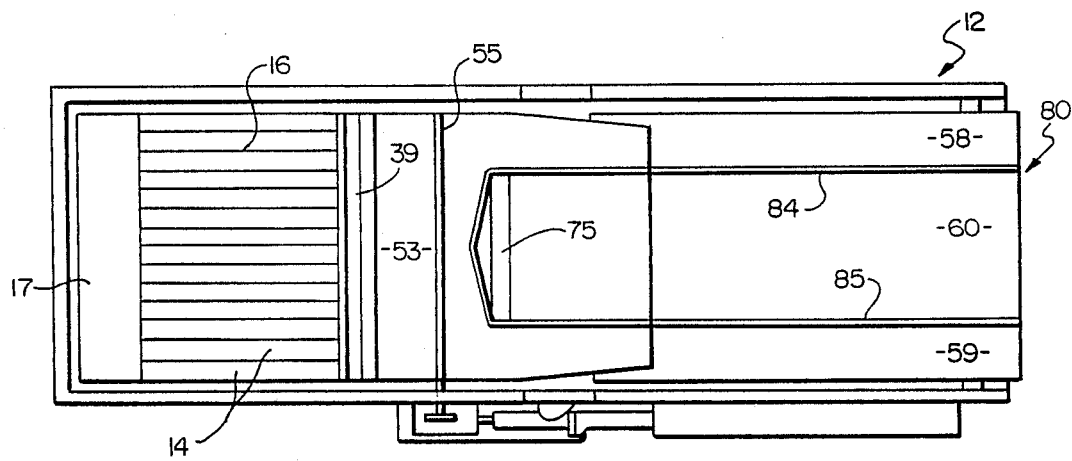
FIG. 1 is a top plan view of a machine embodying the teachings of the present invention.
Figure 2:
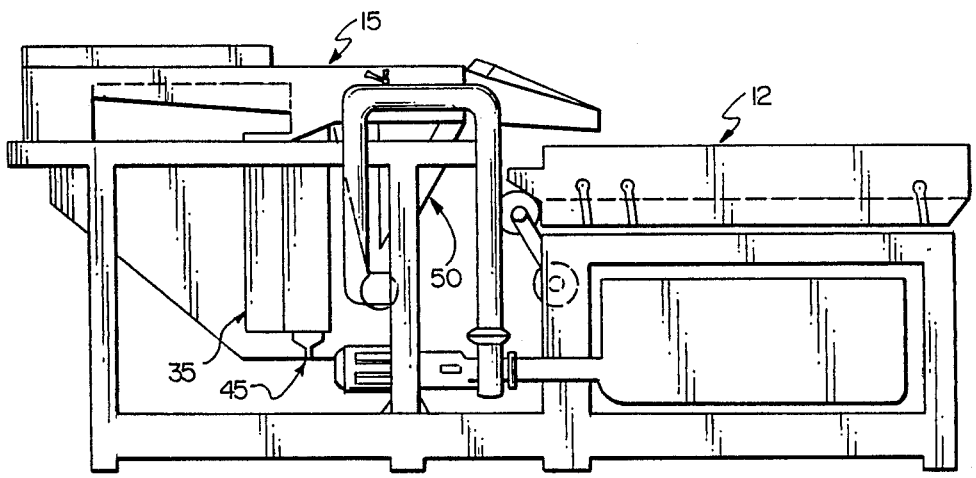
FIG. 2 is a side elevation of the machine shown in FIG. 1.
Figure 4:
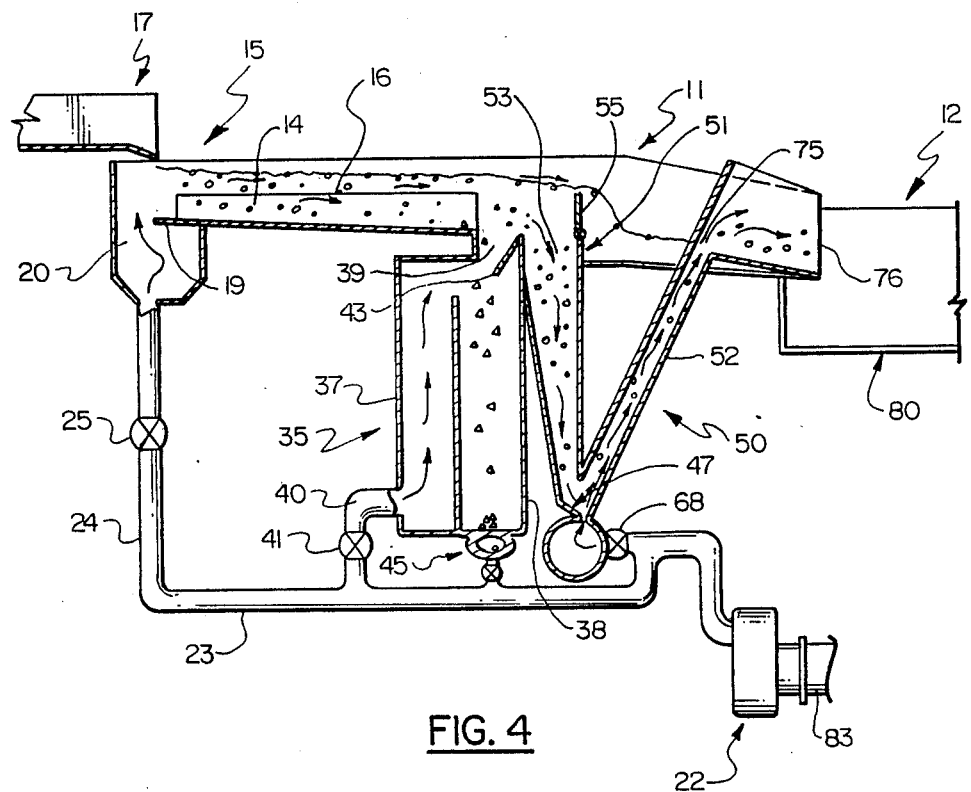
FIG. 4 is a side elevation in section of the flotation tank shown in FIG. 3.

Referring now to the drawing, and particularly FIGS. 1 and 2, there is shown a product separator, generally referenced 10, that is particularly suited for separating peanut kernels that might be infected with aflatoxins from healthy kernels. The present apparatus employs a flotation process in which plain water, that is water without any additives, is used as the separation media. The apparatus includes a feed chamber 15, a flotation tank 11 and a hopper 12 arranged to segregate the desirable kernels from the undesirable kernels as they leave the flotation tank. The peanut kernels are initially delivered into the entrance zone 13 of the feed chamber 15 by means of a conveyor 17 (FIG. 4). The chamber is separated into parallel flow channels 14-14 by means of vertical panels 16-16. The channels serve to distribute the kernels evenly across the width of the feed chamber before they are delivered into the separating tank.

Figure 3:
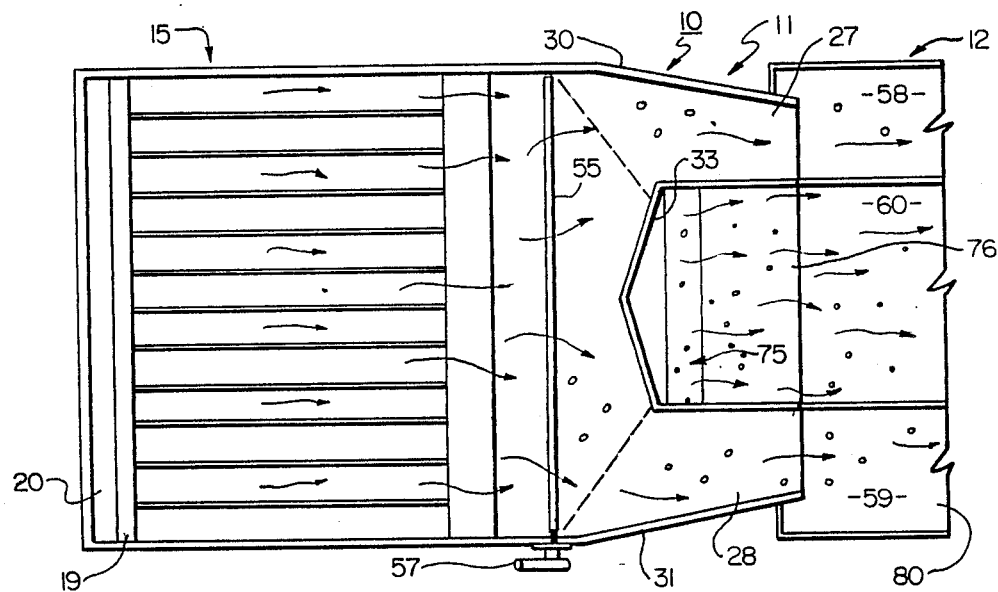
FIG. 3 is an enlarged plan view of the flotation tank utilized in the machine shown in FIG. 1.

With further reference to FIGS. 3 and 4, the conveyor 17, is arranged to gravity feed the peanut kernels onto the bottom wall 19 of the feed chamber at the entrance 13. A water inlet opening 20 is located at the back of the entrance through which a controlled flow of water is admitted into, the chamber. The chamber is inclined toward the flotation tank whereby the water entering the chamber is caused to flow rapidly across the chamber to sweep the nuts into the separation tank.

As seen in FIG. 4, a pump 22 is mounted beneath the tank and is adapted to deliver water under pressure to various sections of the equipment by means of a supply line 23. The supply line is connected to the inlet of the feed chamber by inlet line 24 having a control valve 25 operatively mounted therein. By opening or closing the control valve 25 the rate of flow of water moving across the flotation tank can be closely regulated. The flow of water passes across the tank and is discharged into the hopper through means of two discharge channels 27 and 28 (FIG. 3). The channels are located along the opposing side walls 30 and 31 of the flotation tank and the flow of water passing across the tank is directed equally into the discharge channels by a V-shaped baffle 33 so there is no interruption in the flow passing through the tank.

The kernels leaving the feed chamber in the water flow are first brought over a dirt or stone trap 35 mounted in the floor 36 of the tank immediately adjacent to the feed chamber. The trap includes two adjacent vertical passageways 37 and 38 that communicate with a single opening 39 that extends across the width of the tank. The first passageway 37 is connected to the water supply line 23 by a feeder line 40 containing a control valve 41. A stream of water is introduced into passageway 37 and is moved upwardly so that it is discharged into the main flow passing through the tank through opening 39. The flow is regulated by the control valve to help move the product over the trap but still permit heavier particles such as dirt and stones to pass into the trap.

An inclined plate 43 is positioned in the opening to the trap and serves to direct the heavy particles moving downwardly into the trap into the second passageway 38. A conveyor 45 having a water lock is mounted in the bottom of passageway to collect the heavy particles dropping to the bottom of the trap and carry this unwanted material out of the separator. The water lock permits the dirt to be removed from the separator without disturbing the water flow patterns within the equipment.

A V-shaped duct 50 is connected into the flotation tank of the separator downstream from the dirt trap. The duct includes a vertical capture chute 51 and an inclined discharge chute 52 that are connected at their lower end by a transition piece 47. The capture chute has an entrance position inside the flotation tank that extends across the entire interior width of the tank. An adjustable gate 55 is mounted at the entrance to the capture chute that extends upwardly into the water flow moving across the tank. The gate is mounted on the downstream wall of the capture chute and extends across the width of the tank to intercept the flow stream moving across the tank. Accordingly, less buoyant kernels in the flow, that is, those kernels that are found lower down in the flow stream, are intercepted by the gate and redirected downwardly into the capture chute of the duct.

Figure 6:
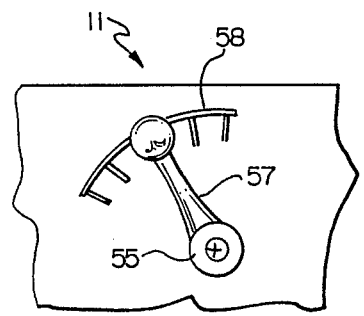
FIG. 6 is a partial enlarged view showing the control mechanism for raising and lowering the gate used in the present invention.

With further reference to FIG. 6, the gate is hingedly mounted on the back wall of capture leg chute a pivot pin 56. One end of the pin passes out of the separator through side wall 31 (FIG. 3) and has a crank arm 57 keyed thereto. An indicator 58 is mounted on the wall behind the crank arm which provides the operator with a visual indication of the gate setting. As can be seen, by adjusting the crank arm to various settings the height of the gate over the capture leg inlet can be regulated thus providing a means for selectively separating desirable product from undesirable product. The more buoyant undesirable kernels that are carried by the water flow over the gate are directed by baffle 33 into the two previously noted discharge channels 27 and 28 and conducted into hopper 12. The hopper is divided into three separated zones that include two outside zones 58 and 59 into which the channels 27 and 28 discharge and a central zone 60, the purpose of which will be explained in greater detail below.

Figure 5:
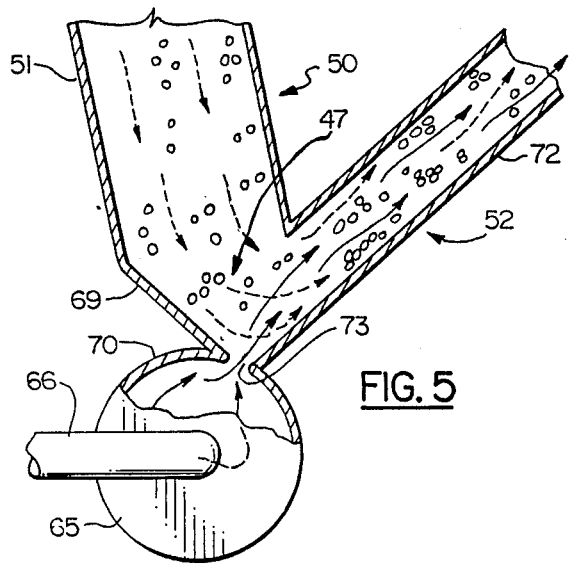
FIG. 5 is a further enlarged side elevation in section showing the ejector used in the present invention.

Turning back to FIG. 4, a water ejector is mounted outside of duct 50 behind the transition piece 47. The ejector includes a cylindrical header 65 that is connected to the pump 22 by header line 66 (FIG. 5). A control valve 68 is placed in the header line to regulate the flow of water delivered to the header. The bottom wall 69 of the transition piece is inclined with respect to the horizontal plane and is tangentially joined to the top part of the header shell 70. The bottom wall 72 of the duct discharge chute 52 is also joined to the header shell opposite bottom wall 69 to provide a narrow uninterrupted slit or nozzle 7 that passes across the transition piece. A nozzle 73 is located in the shell of the header and is arranged to discharge a high velocity stream of water into the transition piece through the slit into the upwardly inclined discharge unit. The ejector nozzle is specifically designed to produce a continuous wall of water moving upwardly through the discharge chute that will sweep any product falling to the transition piece quickly out of the duct through discharge opening 75 (FIG. 4). The discharged product is conducted by an inclined plate 76 into the central zone 60 of the hopper 12.

When separating certain products in a water bath, it is oftentimes essential to minimize the amount of time the product remains in the bath to prevent it from becoming water damaged. If any of the kernels become stagnated in the bath solution for longer periods they might begin to spoil while in storage and the spoilage will spread rapidly to the surrounding product. The gating system and the nozzle arrangement in the transition piece of the separating duct 50 serve to eliminate regions of stagnant water throughout the flow system in which the kernels may be trapped for extended periods of time. Tests run on this type of capture and discharge system show that the individual kernels move through the duct in continuous streamlines without interruption and as a result the exposure time of the product to water is minimized.

The floor 80 of the hopper 12 is made of a fine mesh screen that retains product deposited thereon while allowing the water to pass therethrough into a reservoir 81 (FIG. 2). The reservoir is connected to the pump 22 by a suction line 83 whereby the water is recirculated through the separator. As noted above, the hopper is separated by longitudinal walls 84 and 85 into two outside zones 58 and 59 for collecting the undesirable kernels and a central zone 60 for collecting the desirable kernels. The bin is connected to a vibrator unit 86 by a series of rocker arms 87-87. The vibrator is arranged to oscillate at a speed sufficient to remove water from the kernels. The moisture free kernels are removed from the bin by any suitable means and further dried in an oven or the like.

While this invention has been explained with reference to the structure disclosed herein, it is not confined to the details set forth and this application is intended to cover any modifications and changes as may come within the scope of the following claims.

What is claimed is:

1. Apparatus for separating healthy peanut kernels from unhealthy peanut kernels comprising:

a rectangular separation tank for holding a quantity of water which has an inlet at one end and an outlet at the opposite end, said tank having a width substantially greater than the depth thereof;

a feed chamber formed in the inlet of said separation tank, said feed chamber having a width about equal to the width of the separation tank and a bottom wall containing vertically disposed vanes mounted thereacross which define uniformly spaced peanut distributing channels that extend substantially along the length of the chamber, said bottom wall sloping downwardly from an inlet end of the feed chamber towards an outlet end of the feed chamber;

pump means for introducing a first flow of water into the inlet end of said feed chamber and into said distributing channels so that water flows across the separation tank between said feed chamber inlet and said feed chamber outlet along well-defined streamlines and continues to flow to the tank outlet;

conveyor means for loading peanut kernels onto said bottom wall across said distributing channels so that the peanut kernels are carried in said well-defined streamlines through said feed chamber and said separation tank;

a first heavy particle separating trap mounted in the floor of said separation tank immediately downstream of the outlet end of the feed chamber;

means for directing a second flow of water from said pump means upwardly across the mouth of said trap to help healthy peanut kernels thereacross;

a vertically disposed capture duct having a rectangular cross section mounted in the floor of the separation tank immediately downstream from said first trap, said capture duct having an upstream wall and a downstream wall which define a rectangular entrance that extends across the width of said separation tank;

an upwardly inclined discharge duct connected to the bottom of said capture duct and extending to a height below the bottom wall of said feed chamber, gate means mounted on the downstream wall of said capture duct so as to extend across the width of the separation tank and direct less buoyant, healthy kernels into the capture duct and allow more buoyant, unhealthy kernels to pass over said gate means and out of said separation tank through said separation tank outlet;

ejector means mounted in the bottom of the captured duct having an elongated slot nozzle extending across the width of said capture duct;

means for directing a third flow of water from said pump means through said slot nozzle into the discharge duct for sweeping the bottom of the capture duct to clean out, and propel healthy peanut kernels falling to the bottom of the capture duct upwardly through the discharge duct;

dewatering means mounted at the exit of said upwardly inclined discharge duct for immediately removing the discharge water as the healthy kernels leave the discharge duct.

2. The apparatus of claim 1 wherein the gate means includes a panel connected to the capture duct and means for adjusting the height that the panel extends above the entrance to the capture duct.

3. The apparatus of claim 1 wherein said dewatering means includes a screen upon which kernels leaving the discharge duct are deposited and means for vibrating said screen.

4. The apparatus of claim 1 that further includes a trap means mounted in the floor of the separation tank between said inlet to the tank and the entrance to the capture duct, for removing dirt from said tank.

* * * * *